US012617945B2

(12) United States Patent
Gradelet et al.

(10) Patent No.: US 12,617,945 B2
(45) Date of Patent: May 5, 2026

(54) THERMOPLASTIC COMPOSITION

(71) Applicant: MULTIBASE S.A., Saint Laurent du Pont (FR)

(72) Inventors: Yann Gradelet, Saint Laurent du Pont (FR); Sylvain Boucard, Saint Laurent du Pont (FR)

(73) Assignee: MULTIBASE S.A., Saint Laurent du Pont (FR)

( * ) Notice: Subject to any disclaimer, the term of this patent is extended or adjusted under 35 U.S.C. 154(b) by 946 days.

(21) Appl. No.: 16/980,101

(22) PCT Filed: Apr. 5, 2019

(86) PCT No.: PCT/EP2019/058726

§ 371 (c)(1),
(2) Date: Sep. 11, 2020

(87) PCT Pub. No.: WO2019/193192

PCT Pub. Date: Oct. 10, 2019

(65) Prior Publication Data

US 2021/0024750 A1 Jan. 28, 2021

(30) Foreign Application Priority Data

Apr. 5, 2018 (EP) .................................... 18305401

(51) Int. Cl.

| | |
|---|---|
| ***C08L 83/04*** | (2006.01) |
| ***C08G 77/12*** | (2006.01) |
| ***C08G 77/20*** | (2006.01) |
| ***C08K 3/36*** | (2006.01) |

(52) U.S. Cl.

CPC .............. *C08L 83/04* (2013.01); *C08G 77/12* (2013.01); *C08G 77/20* (2013.01); *C08K 3/36* (2013.01); *C08L 2205/025* (2013.01); *C08L 2207/04* (2013.01)

(58) Field of Classification Search

CPC ....................................................... C08L 83/04

See application file for complete search history.

(56) References Cited

U.S. PATENT DOCUMENTS

| | | | | |
|---|---|---|---|---|
| 6,153,691 | A * | 11/2000 | Gornowicz | C08L 53/025 525/453 |
| 6,281,286 | B1 | 8/2001 | Chorvath et al. | |
| 6,569,955 | B1 | 5/2003 | Brewer et al. | |
| 2011/0248424 | A1 | 10/2011 | Milesi | |
| 2017/0058114 | A1 | 3/2017 | Arrigoni et al. | |
| 2017/0313882 | A1 | 11/2017 | Boucard et al. | |
| 2021/0009768 | A1* | 1/2021 | Rerat | C10M 169/041 |

FOREIGN PATENT DOCUMENTS

| | | | | |
|---|---|---|---|---|
| CN | 102924793 A | | 2/2013 | |
| WO | 1999-45072 | | 9/1999 | |
| WO | WO-2016079324 A1 | * | 5/2016 | C08G 77/12 |
| WO | 2017-143508 A1 | | 8/2017 | |

OTHER PUBLICATIONS

CN102924793A English Translation.

* cited by examiner

*Primary Examiner* — Vickey Nerangis
(74) *Attorney, Agent, or Firm* — Matthew T. Fewkes

(57) ABSTRACT

Thermoplastic silicone vulcanisates as masterbatch additives in thermoplastic compositions including thermoplastic elastomer compositions are disclosed. Using thermoplastic silicone vulcanisates as masterbatch additives have been found to, for example increase impact resistance, decrease mechanical modulus and increase surface properties comparative to non-modified thermoplastic compositions. A process for making the masterbatch and thermoplastic composition is also described.

7 Claims, No Drawings

THERMOPLASTIC COMPOSITION

CROSS REFERENCE TO RELATED APPLICATIONS

This application is a U.S. national stage filing under 35 U.S.C. § 371 of PCT Application No. PCT/EP19/58726 filed on Apr. 5, 2019, currently pending, which claims the benefit of EP patent application Ser. No. 18/305,401.4 filed Apr. 5, 2018 under 35 U.S.C. § 119 (e). PCT Application No. PCT/EP19/58726, EP patent application Ser. No. 18/305, 401.4 are hereby incorporated by reference.

This disclosure relates to thermoplastic silicone vulcanisates as masterbatch additives in thermoplastic compositions including thermoplastic elastomer compositions. A process for making the masterbatch and thermoplastic composition is also described.

A Thermoplastic material is a plastic material that becomes pliable or moldable above a specific temperature and solidifies upon cooling. When reheated the thermoplastic material can be remoulded into a new shape. In contrast a thermoset material is a plastic that is irreversibly cured from a soft solid or viscous liquid prepolymer or resin and once cured/hardened a thermoset material cannot be remoulded into a new shape upon reheating.

Thermoplastic elastomers (TPEs) are thermoplastic materials which possess both plastic and rubbery properties. Whilst TPEs have elastomeric mechanical properties, unlike conventional thermoset rubbers, they can be re-processed at elevated temperatures. This re-process ability is a major advantage of TPEs over chemically crosslinked rubbers since it allows recycling of fabricated parts and results in a considerable reduction of scrap.

In general, two main types of thermoplastic elastomers are known, block copolymer TPEs and simple blend TPEs (physical blends).

Block copolymer TPEs contain (i) blocks or segments that are called hard or rigid (i.e. having a thermoplastic behaviour), typically these have a melting point or glass transition temperature above ambient temperature; and (ii) blocks or segments that are called soft which are pliable or flexible (i.e. having an elastomeric behaviour) and typically have a low glass transition temperature (Tg) or a melting point considerably below room temperature.

The expression "low glass transition temperature" is understood to mean a glass transition temperature Tg below 15° C., preferably below 0° C., advantageously below −15° C., more advantageously below −30° C., possibly below −50° C.

In block copolymer thermoplastic elastomers, the hard segments aggregate to form distinct micro phases and act as physical crosslinks for the soft phase, thereby imparting a rubbery character at room temperature. At elevated temperatures, the hard segments melt or soften and allow the copolymer to flow and to be processed. The hard blocks are generally based on polyamides, polyurethanes, polyesters, polystyrene, polyolefin or a mixture of thereof. The soft blocks are generally based on polyethers, polyester, polyolefin and copolymers or blends thereof.

TPEs referred to as simple blends or physical blends can be obtained by uniformly mixing an elastomeric component with a thermoplastic resin.

For a long period, (Since the 1950s), many efforts have been made to modify the properties of thermoplastic materials such as impact resistance. In the case of polystyrene, this lead to the development of high impact polystyrene (HIPS). In the case of other thermoplastic polymers such as acrylonitrile butadiene styrene (ABS), polyvinylchloride (PVC), polypropylene (PP) and polyamides (PA) improvements in impact resistance properties have been obtained by the dispersion of one or more elastomers in the thermoplastic concerned. It was identified that one of the key factors to achieve such improvements is the control of the quality and homogeneity of the elastomer particle dispersion and contact intimacy between phases. Principal elastomers used were nitrile butadiene rubber (NBR), natural rubber (NR), ethylene vinyl acetate (EVA), polymethacrylate butadiene styrene (MBS), olefinic elastomers such as polypropylene (PP) and/or polyethylene (PE) polymers and copolymers, and terpolymer of polyolefins, ethylene propylene diene monomer rubber (EPDM), styrene block polymer acrylic elastomers.

However the introduction of such elastomer particles had a negative effect on other properties, for instance, a decrease in surface performance properties resulting in a poorer scratch and/or mar resistance, higher coefficient of friction (COF) values were also identified. These as a result of the introduction of the elastomer phase which may be present at surface which provides an overall rubbery effect. Up to now, there is no unique solution able to jointly improve impact resistance, brings elastomeric behavior and improve surface performance properties such as mar and abrasion resistance.

Masterbatches of uncured organopolysiloxane polymers in thermoplastics and/or TPEs are a proven solution to enhance surface performance of the thermoplastics and/or TPEs. Siloxane masterbatches containing high molecular weight siloxane polymer dispersed in various thermoplastic resins have been successfully used in automotive interior and exterior components and in consumer applications such as laptop computers and cellular phone cases, and in tubing and film markets. The siloxane polymer migrates to the surface in the melt phase and gives scratch and mar resistance without the adverse effect of additive exudation of a small molecule additive.

Siloxane masterbatches are masterbatches containing siloxanes (also referred to as silicones). A masterbatch is typically a solid additive for plastic or other polymer which is used to impart desired properties to this plastic or other polymer. A masterbatch is typically a concentrated mixture of additives encapsulated into a carrier resin during a process involving heat, which is then cooled and cut into granular shape. This imparts desired properties to a polymer. Masterbatches are typically in solid form at ambient temperature, usually in a pelletized form. Siloxane masterbatches are typically pelletized micro-dispersions of siloxane polymers, in various different plastic carrier resins at loadings of up to 50%. Siloxane Masterbatches are produced in solid form for ease of use. They typically contain 25-50% siloxane polymers (generally gums with a viscosity >1 million $mm^2 \cdot s^{-1}$ (cSt), typically >15 million $mm^2 \cdot s^{-1}$ (cSt)) dispersed with for example an average particle size of 5 μm in various thermoplastics. A siloxane is a compound which contains at least one Si—O—Si link. A polymer is a compound containing repeating units. A plastic or organic thermoplastic material or thermoplastic organic polymer is a polymer based on C—C links and having thermoplastic properties. A siloxane polymer also called polysiloxane or silicone is a polymer containing repeating Si—O—Si units. An organopolysiloxane compound is a polysiloxane bearing substituents which constituents contain organic moieties.

The most commonly used silicones are linear PDMS (polydimethylsiloxanes) of various viscosities, ranging from the shortest possible chain, hexamethyldisiloxane with a viscosity of, for example, 0.65 $mm^2 \cdot s^{-1}$ (cSt), to polymers with high degrees of polymerization and viscosities over for example $10^6$ $mm^2 \cdot s^{-1}$ (cSt), often called silicone gums. PDMS gums are usually fluids with viscosity around or higher than 600,000 $mm^2 \cdot s^{-1}$ (cSt). However, as the polysiloxane morphology is not fixed, there are drawbacks in their use e.g. the addition level is limited to a maximum of up to about 5% by weight of silicone in the composition. Above this level, coalescence of the silicone domain is observed leading to a progressive and continuous loss in mechanical performance of the final blend comparatively to the initial. This noticeably results in an impact resistance loss, decrease of tensile strain and stress at break. The viscosity values of high viscosity diorganopolysiloxane polymers (e.g. ≥1000000 $mm^2 \cdot s^{-1}$ (cSt)) may be measured by using an AR 2000 Rheometer from TA Instruments of New Castle, DE, USA or a suitable Brookfield viscometer using the most appropriate spindle for the viscosity being measured. However, the siloxane may be a silicone gum which is a polymer of high molecular weight with a very high viscosity. A gum will typically have a viscosity of at least 2000 000 $mm^2 \cdot s^{-1}$ (cSt) at 25° C. but generally has a significantly greater viscosity. Hence, gums are often characterised by their Williams plasticity value in accordance with ASTM D-926-08 given the viscosity becomes very difficult to measure.

Another way of modifying a TPE has been identified. The elastomeric component of a TPE may be cross-linked during mixing this creates a special form of TPE known in the art as a thermoplastic vulcanizate (TPV) in which the cross-linked elastomeric phase is insoluble and non-flowable at elevated temperature, TPVs generally exhibit improved oil and solvent resistance as well as reduced compression set relative to the simple blends. Typically, a TPV is formed by a process known as dynamic vulcanization, wherein the components required to make the elastomer (e.g. polymer, cross-linker and catalyst) and the thermoplastic matrix are mixed together and the elastomer is simultaneously cured to create a "co-continuous blend" of thermoplastic matrix and elastomer.

A number of such TPVs are known in the art, including some wherein the crosslinked elastomeric component can be a silicone polymer cured with the aid of a crosslinking agent and/or catalyst during the mixing process while the thermoplastic component is an organic, non-silicone polymer such TPVs are sometimes referred to as thermoplastic silicone vulcanizates or TPSiVs subsequent to their manufacture, TPVs e.g. TPSiVs may be processed by conventional techniques, such as extrusion, vacuum forming, injection moulding, blow moulding, 3D printing or compression moulding, to fabricate plastic parts.

Herein there is described a thermoplastic masterbatch (B) comprising (B1) one or more thermoplastic organic materials, (B2) a silicone elastomer; and optionally (B3) an uncured organopolysiloxane polymer in which masterbatch (B) there is contained from 20% to 60% by weight of cross-linked silicone elastomer based on the weight of (B1)+(B2)+(B3).

There is also provided a thermoplastic composition comprising a blend of (A) one or more thermoplastic organic materials, with (B) a masterbatch comprising (B1) one or more thermoplastic organic materials, (B2) a silicone elastomer; and optionally (B3) an uncured organopolysiloxane polymer in which masterbatch (B) there is contained from 20% to 60% by weight of cross-linked silicone elastomer based on the weight of (B1)+(B2)+(B3) and in which thermoplastic composition there is a total of from 0.2 to 25% by weight of cross-linked silicone elastomer based on the weight of (A)+(B). The thermoplastic composition may be a thermoplastic elastomer composition.

In an alternative embodiment there is provided a method of making a masterbatch (B) as hereinbefore described comprising (i) blending the components used to produce silicone elastomer (B2) with one or more thermoplastic organic materials (B1), (ii) dynamically vulcanising the silicone composition to form silicone elastomer (B2), and (iii) introducing (B3), during step (ii) or after step (iii);

in which masterbatch (B) there is contained a total of from 20% to 60% by weight of components (B2)+(B3) based on the weight of (B1)+(B2)+(B3).

In an alternative embodiment there is provided a method of making a thermoplastic composition by making a masterbatch as hereinbefore described and blending the resulting masterbatch with one or more thermoplastic organic materials (A) in an amount such that the thermoplastic composition a total of from 0.2 to 25% by weight of cross-linked silicone elastomer based on the weight of (A)+(B). The thermoplastic composition may be a thermoplastic elastomer composition.

There is also provided herein the use of a thermoplastic silicone vulcanisate as a masterbatch as hereinbefore described to modify the physical properties of a thermoplastic composition. The thermoplastic composition may be a thermoplastic elastomer composition.

Introducing a silicone vulcanized phase into a thermoplastic provides benefits, thanks to the flexibility and high elasticity of the silicone once crosslinked, the low Tg of the polydimethylsiloxane, and the surface modification brought by the silicone domain at surface. These benefits are still confirmed even at high Si content, the crosslinking of silicone in finite particles enabling the coalescence in larger size silicone domains.

Benefits of present invention include the ability to make a concentrate containing from 20 to 60% (by weight) of silicone elastomer, such concentrate being then able to be dispersed in a thermoplastic to have in the final material from 0.5 to 25% of Si Phase, the addition of this concentrate in the defined range leading to the adjustment of final product performance to the desired Impact, flexibility and surface performance. Using thermoplastic silicone vulcanisates as masterbatch additives were surprisingly found to, for example, increase impact resistance, decrease mechanical modulus and increase surface properties when compared with non-modified thermoplastic compositions.

For the avoidance of doubt, silanes and siloxanes are compounds containing silicon.

A silane is a compound derived from $SiH_4$. A silane often contains at least one Si—C bond and unless otherwise indicated contains only one Si atom.

A polysiloxane contains several Si—O—Si— bonds forming a polymeric chain, where the backbone of the polymeric chain is made up of —(Si—O)— repeating units. An organopolysiloxane contains repeating —(Si—O)— units where at least one Si atom bears at least one organic group. "Organic" means containing at least one carbon atom. An organic group is a chemical group comprising at least one carbon atom.

A polysiloxane comprises terminal groups and pendant groups. A terminal group is a chemical group located on a Si atom which is at an end of the polymer chain. A pendant group is a group located on a Si atom which Si atom is not at the end of the polymeric chain. Typically, an organopolysiloxane contains a mixture of the following structures:

(M)

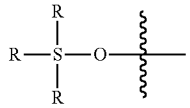

(D)

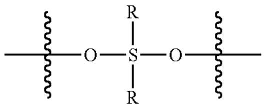

(T)

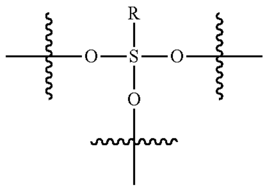

(Q)

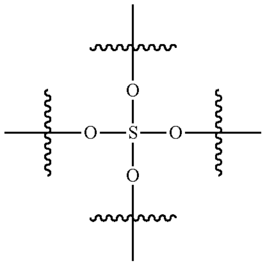

wherein each of M, D, T, and Q independently represent functionality of structural groups of organopolysiloxane. Specifically, M represents a monofunctional group $R_3SiO_{1/2}$; D represents a difunctional group $R_2SiO_{2/2}$; T represents a trifunctional group $RSiO_{3/2}$; and Q represents a tetrafunctional group $SiO_{4/2}$. Hence, for example linear organopolysiloxanes have a backbone of D units and the terminal groups are M units and branched organopolysiloxanes may, for example, have a backbone of D units interspersed with T and/or Q units.

A polymer is a compound containing repeating units which units typically form at least one polymeric chain. A polymer can be a homopolymer or a copolymer. A homopolymer is a polymer which is formed from only one type of monomer. A copolymer is a polymer formed from at least two different monomers. A polymer is called an organic polymer when the repeating units contain carbon atoms.

A cross linking reaction is a reaction where two or more molecules, at least one of them being a polymer, are joined together to harden or cure the polymer. A cross linker is a compound able to produce a crosslinking reaction of a polymer.

The one or more thermoplastic organic materials (B1) may be selected from polycarbonates (PC); blends of polycarbonates with other polymers as exemplified by polycarbonate-acrylonitrile-butadiene-styrene (PC/ABS) blends and polycarbonate-polybutylene terephthalate (PC/PBT) blends; polyamides exemplified by Nylons such as polycaprolactam (Nylon-6), polylauryllactam (Nylon-12), polyhexamethyleneadipamide (Nylon-6,6), and polyhexamethylenedodecanamide (Nylon-6,12), poly(hexamethylene sebacamide (Nylon 6,10), and blends of Nylons with other polymers; polyesters exemplified by polybutylene terephthalate (PBT), polyethylene terephthalate (PET), and polyethylene naphthalate (PEN), polyphenylene ether (PPE) and polyphenyleneoxide (PPO), and blends of PPE or PPO with styrenics such as high-impact polystyrene (HIPS), polystyrene, acrylonitrile-butadiene-styrene-(ABS) and styrene acrylonitrile resins (SAN); polyphenylene sulphide (PPS), polyether sulphone (PES), polyaramids, polyimides, phenyl-containing resins having a rigid rod structure, styrenic materials exemplified by ABS (acrylonitrile-butadiene-styrene), polystyrene (PS) and HIPS; polyacrylates, SAN; halogenated plastics exemplified by polyvinyl chloride, fluoroplastics, and any other halogenated plastics; polyketones, polymethylmethacrylate (PMMA), Polyolefins exemplified by polypropylene (PP), polyethylene (PE) including high density polyethylene (HDPE) and low density polyethylene (LDPE), polybutene (PB) as well as, copolymers and blends of polyolefin, thermoplastic elastomers such as thermoplastic urethanes, thermoplastic polyolefinic elastomers, thermoplastic vulcanizates; and styrene ethylene butylene styrene (SEBS) copolymer, and natural products such as cellulosics, rayon, and polylactic acid. As previously indicated the one or more thermoplastic organic materials (B1) may be a mixture of more than one of the thermoplastic resins described above.

Component (B1) is present in an amount of from 40 to 80% by weight of the total weight of component B; alternatively, component (B1) is present in an amount of from 45 to 70% by weight of the total weight of component B.

Silicone elastomer (B2) may be prepared by curing one of the following compositions:

(B2a1) A diorganopolysiloxane having an average of at least two alkenyl groups per molecule and either (i) an organopolysiloxane having at least two Si-bonded hydrogen atoms, alternatively at least three Si-bonded hydrogen atoms per molecule (B2a2) and a hydrosilylation catalyst (B2a3) and optionally a catalyst inhibitor (B2a5); or (ii) a radical initiator (B2a4).

Alternatively Silicone elastomer (B2) may be prepared by curing a composition comprising a silanol terminated diorganopolysiloxane (B2b1), organopolysiloxane having at least two Si-bonded hydrogen atoms, alternatively at least three Si-bonded hydrogen atoms per molecule (B2a2) and a condensation catalyst (B2b3).

The silicone elastomer present in the masterbatch is present in an amount of from 20 to 60% by weight of the total weight of component (B); alternatively the silicone elastomer present in the masterbatch is present in an amount of from 30 to 55% by weight of the total weight of component (B);

Diorganopolysiloxane Having an Average of at Least Two Alkenyl Groups Per Molecule (B2a1)

The diorganopolysiloxane polymer (B2a1) is a fluid or gum having a viscosity of at least 100 000 $mm^2 \cdot s^{-1}$ (cSt) at 25° C. alternatively at least 1000000 $mm^2 \cdot s^{-1}$ (cSt) at 25° C.

The silicon-bonded organic groups of component (B2a1) are independently selected from hydrocarbon or halogenated hydrocarbon groups. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; alkenyl groups having 2 to 20 carbon atoms, such as vinyl, allyl and hexenyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane has a glass transition temperature (or melt point) which is below room temperature such that this component forms an elastomer when cured. Methyl preferably makes up at least 85, more preferably at least 90, mole percent of the silicon-bonded organic groups in component (B2a1).

Thus, polydiorganosiloxane (B2a1) can be a homopolymer, a copolymer or a terpolymer containing such organic groups. Examples include fluids or gums comprising dimethylsiloxy units, dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures of dimethylsiloxy units being preferred. Examples may include an α,ω-vinyldimethylsiloxy polydimethylsiloxane, an α,ω-vinyldimethylsiloxy copolymer of methylvinylsiloxane and dimethylsiloxane units, and/or an α,ω-trimethylsiloxy copolymer of methylvinylsiloxane and dimethylsiloxane units.

The diorganopolysiloxane polymer (B2a1) has a viscosity of at least 1000000 $mm^2 \cdot s^{-1}$ (cSt) at 25° C. measured may be measured by using an AR 2000 Rheometer from TA Instruments of New Castle, DE, USA or a suitable Brookfield viscometer with the most appropriate spindle for the viscosity being measured. The diorganopolysiloxane polymer (B2a1) can if desired be a gum characterized by a Williams plasticity value of at least 100 mm/100 as measured by ASTM D-926-08 using a Williams Parallel plate plastimeter given the viscosity values are so high they become very difficult to determine with accuracy. The diorganopolysiloxane polymer (B2a1) can if desired be modified with a small amount of an unreactive silicone such as a trimethylsilyl-terminated polydimethylsiloxane. In one alternative the diorganopolysiloxane polymer (B2a1) is a gum.

The alkenyl groups of the diorganopolysiloxane (B2a1) can be exemplified by vinyl, hexenyl, allyl, butenyl, pentenyl, and heptenyl groups. Silicon-bonded organic groups in diorganopolysiloxane polymer (B2a1) other than alkenyl groups may be exemplified by methyl, ethyl, propyl, butyl, pentyl, hexyl, or similar alkyl groups; or phenyl, tolyl, xylyl, or similar aryl groups.

Organopolysiloxane Having at Least Two Si-Bonded Hydrogen Atoms, Alternatively at Least Three Si-Bonded Hydrogen Atoms Per Molecule (B2a2)

The Organopolysiloxane having at least two Si-bonded hydrogen atoms, alternatively at least three Si-bonded hydrogen atoms per molecule (B2a2) can for example be a low molecular weight organosilicon resin or a short or long chain organosiloxane polymer, which may be linear or cyclic. The silicon-bonded organic groups of component (B2a2) are independently selected from any of the hydrocarbon or halogenated hydrocarbon groups described above in connection with diorganopolysiloxane (B2a1 and B2b1), including preferred embodiments thereof. The molecular structure of component (B2a2) is also not critical and is exemplified by straight-chain, partially branched straight-chain, branched, cyclic and network structures, linear polymers or copolymers being preferred, and this component should be effective in curing component (B2a1 and B2b1). (B2a2)_preferably has at least 3 silicon-bonded hydrogens per molecule which are capable of reacting with the alkenyl or other aliphatically unsaturated groups of the diorganopolysiloxane polymer (B2a1) and the —OH groups of (B2b1) as will be discussed further below). The position of the silicon-bonded hydrogen in component (B2a2) is not critical, i.e. the Si—H groups may be terminal groups or pendant groups in non-terminal positions along the molecular chain or at both positions. To ensure cross-linking when (B2a2) has only two Si—H bonds at least some of the respective polymer (B2a1) or (B2b1) needs to have at least 3 groups with which (B2a2) molecules can react. The organopolysiloxane having at least two Si-bonded hydrogen atoms, alternatively at least three Si-bonded hydrogen atoms per molecule (B2a2) may for example have the general formula $$R^3R^4{}_2SiO(R^4{}_2SiO)_p(R^4HSiO)_qSiR^4{}_2R^3 \text{ or}$$

$$\overline{\underline{\quad (R^4{}_2SiO)_p — (R^4HSiO)_q \quad}}$$

wherein $R^4$ denotes an alkyl or aryl group having up to 10 carbon atoms, and $R^3$ denotes a group $R^4$ or a hydrogen atom, p has a value of from 0 to 20, and g has a value of from 1 to 70, and there are at least 2 or 3 silicon-bonded hydrogen atoms present per molecule. R4 can for example be a lower alkyl group having 1 to 3 carbon atoms, such as a methyl group. The Organopolysiloxane having at least two Si-bonded hydrogen atoms, alternatively at least three Si-bonded hydrogen atoms per molecule (B2a2) can for example have a viscosity of from 0.5 to 1000 $mm^2 \cdot s^{-1}$ (cSt) at 25° C., alternatively 2 to 100 $mm^2 \cdot s^{-1}$ (cSt) or 5 to 60 $mm^2 \cdot s^{-1}$ (cSt) at 25° C. The average degree of polymerisation of (B2a2) can for example be in the range 30 to 400 siloxane units per molecule.

Component (B2a2) may be exemplified by the following siloxanes typically having a viscosity of from 0.5 to 1000 $mm^2 \cdot s^{-1}$ (cSt) at 25° C. low molecular siloxanes, such as $PhSi(OSiMe_2H)_3$;

trimethylsiloxy-end blocked methylhydridopolysiloxanes;

trimethylsiloxy-end blocked dimethylsiloxane-methylhydridosiloxane copolymers;

dimethylhydridosiloxy-endblocked dimethylpolysiloxanes;

dimethylhydrogensiloxy-end blocked methylhydrogenpolysiloxanes;

dimethylhydridosiloxy-endblocked dimethylsiloxane-methylhydridosiloxane copolymers;

cyclic methylhydrogenpolysiloxanes;

cyclic dimethylsiloxane-methylhydridosiloxane copolymers;

tetrakis(dimethylhydrogensiloxy)silane;

silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units (B2a2) may comprise a mixture of more than one of these materials.

The molar ratio of Si—H groups in (B2a2) to aliphatically unsaturated groups in the diorganopolysiloxane polymer (B2a1) is preferably at least 1:1 and can be up to 8:1 or 10:1. For example the molar ratio of Si—H groups to aliphatically unsaturated groups is in the range from 1.5:1 to 5:1.

(B2a2) is used at a level such that the molar ratio of Si—H therein to Si—OH in component (B2b1) is about 0.5 to 10, preferably 1 to 5 and most preferably about 1.5.

These Si—H-functional materials are well known in the art and many of them are commercially available.

Hydrosilylation Catalyst (B2a3)

The hydrosilylation catalyst (B2a3) is preferably a platinum group metal (platinum, ruthenium, osmium, rhodium, iridium and palladium) or a compound thereof. Platinum and/or platinum compounds are preferred, for example finely powdered platinum; a chloroplatinic acid or an alcohol solution of a chloroplatinic acid; an olefin complex of a chloroplatinic acid; a complex of a chloroplatinic acid and an alkenylsiloxane; a platinum-diketone complex; metallic platinum on silica, alumina, carbon or a similar carrier; or a thermoplastic resin powder that contains a platinum compound. Catalysts based on other platinum group metals can be exemplified by rhodium, ruthenium, iridium, or palladium compounds. For example, these catalysts can be represented by the following formulas: $RhCl(PPh_3)_3$, $RhCl(CO)(PPh_3)_2$, $Ru_3(CO)_{12}$, $IrCl(CO)(PPh_3)_2$, and $Pd(PPh_3)_4$ (where Ph stands for a phenyl group).

The catalyst (B2a3) is preferably used in an amount of 0.5 to 100 parts per million by weight platinum group metal based on the polyorganosiloxane composition (B), more preferably 1 to 50 parts per million. The hydrosilylation catalyst (B2a3) catalyses the reaction of the alkenyl groups of diorganopolysiloxane polymer (B2a1) with the Si—H groups of (B2a2).

Inhibitor (B2a5).

Optionally, when a hydrosilylation catalyst is being utilised to cure diorganopolysiloxane polymer (B2a1) an inhibitor (B2a5) may be included in the composition to retard the cure process. By the term "inhibitor" it is meant herein a material that retards curing of Components (B2a1) when incorporated therein in small amounts, such as less than 10 percent by weight of the silicone composition of (B2a1) without preventing the overall curing of the mixture.

Inhibitors of platinum group based catalysts (B2a5), especially platinum based catalysts (B2a5) are well known. They include hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic siloxanes, unsaturated hydrocarbon monoesters and diesters, conjugated ene-ynes, hydroperoxides, nitriles, and diaziridines.

The inhibitors (B2a5) used herein, when present, may be selected from the group consisting of acetylenic alcohols and their derivatives, containing at least one unsaturated bond. Examples of acetylenic alcohols and their derivatives include 1-ethynyl-1-cyclohexanol (ETCH), 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, 3-methyl-1-penten-4-yn-3-ol, and mixtures thereof.

Alternatively, the inhibitor (B2a5) is selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 3,5-dimethyl-1-hexyn-3-ol, 1-ethynylcyclopentanol, 1-phenyl-2-propynol, and mixtures thereof.

The inhibitor (B2a5) may typically be a acetylenic alcohols where the at least one unsaturated bond (alkenyl group) is in a terminal position, and further, a methyl or phenyl group may be at the alpha position. The inhibitor may be selected from the group consisting of 1-ethynyl-1-cyclohexanol, 2-methyl-3-butyn-2-ol, 3-butyn-1-ol, 3-butyn-2-ol, propargylalcohol, 2-phenyl-2-propyn-1-ol, 1-phenyl-2-propynol, and mixtures thereof.

The inhibitor (B2a5) may be added in the range of from 0 to 10% by weight of component (B), alternatively 0.05 to 5% by weight of component (B2) But is generally used in an amount sufficient to retard cure of diorganopolysiloxane gum (B2a1) which may be optimized for a given system by those skilled in the art using routine experimentation.

Radical Initiator (B2a4)

Radical initiator (B2a4) is a compound which decomposes at elevated temperature to form radical species. The latter promotes the crosslinking reaction between the alkenyl groups of diorganopolysiloxane gum (B2a1) during the dynamic vulcanization step of the instant method. This component may be illustrated by known azo compounds, carbon compounds and organic peroxy compounds, such as hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkylsulfonyl peroxides and alkyl monoperoxydicarbonates.

For the purposes of the present invention, radical initiator (B2a4) is selected such that the difference between the six-minute half-life temperature of the initiator and the process temperature is between −60° C. and 20° C. That is, the following condition is satisfied: $-60° C. \leq \{T(6)-T(O)\} \leq 20° C.$, wherein T(6) represents the temperature (° C.) at which the initiator has a half-life of 6 minutes and T(O) represents the processing temperature (° C.) prior to initiator addition (i.e., the actual temperature of the mixture of components (B1) through (B3)). The value of T(6) is available from the manufacturer of the initiator or can be determined by methods known in the art. After the initiator is introduced, the temperature generally increases slightly as dynamic vulcanization takes place unless intentional cooling is applied. However, such cooling is not generally required unless temperature increases dramatically (e.g., more than about 30° C.).

Specific non-limiting examples of suitable radical initiators include 2,2'-azobisisobutyronitrile, 2,2'-azobis(2-methylbutyronitrile), dibenzoyl peroxide, tert-amyl peroxyacetate, 1,4-di(2-tert-butylperoxyisopropyl)benzene, tert-butyl cumyl peroxide, 2,4,4-trimethylpentyl-2 hydroperoxide, diisopropylbenzene monohydroperoxide, cumyl hydroperoxide, tert-butyl hydroperoxide, tert-amyl hydroperoxide, 1,1-di(tert-butylperoxy)cyclohexane, tert-butylperoxy isopropyl carbonate, tert-amyl peroxybenzoate, dicumyl peroxide, 2,5-dimethyl-2,5-di-(tert-butylperoxy)hexane bis(1-methyl-1-phenylethyl)peroxide, 2,5-dimethyl-2,5-di-(tert-butylperoxy)hexyne-3, di-tert-butyl peroxide, α,α-dimethylbenzyl hydroperoxide and 3,4-dimethyl-3,4-diphenylhexane.

Initiator (B2a4) is used in an amount sufficient to cure diorganopolysiloxane gum (B2a1) and this amount can be optimized for a given system by those skilled in the art using routine experimentation. When the amount is too low, insufficient crosslinking takes place and mechanical properties will be poor. It is readily determined by a few simple experiments for the system under consideration. On the other hand, when excess initiator is added, it is uneconomical and undesirable side reactions, such as polymer degradation, tend to occur. Initiator (B2a4) is preferably added at a level of 0.05 to 6 parts by weight, alternatively 0.2 to 3 parts by weight, for each 100 parts by weight of diorganopolysiloxane (B2a1).

Diorganopolysiloxane (B2b1)

Diorganopolysiloxane (B2b1) is a fluid or gum terminated with silanol (i.e., —Si—OH) groups having a viscosity of at least 100 000 $mm^2 \cdot s^{-1}$ (cSt) at 25° C., alternatively at least 1000000 $mm^2 \cdot s^{-1}$ (cSt) at 25° C. The silicon-bonded organic groups of component (B2b1) are independently selected from hydrocarbon or halogenated hydrocarbon groups as defined for B2a1) above. Again, methyl preferably makes up at least 85, more preferably at least 90, mole percent of the silicon-bonded organic groups in component (B2b1).

Thus, polydiorganosiloxane (B2b1) can be a homopolymer, a copolymer or a terpolymer containing such organic groups. Examples include fluids or gums comprising dimethylsiloxy units, dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B2b1) include: dimethylhydroxysiloxy-end-blocked dimethylsiloxane homopolymers; dimethylhydroxysiloxy end-blocked methylphenylsiloxane-dimethylsiloxane copolymers; and dimethylhydroxysiloxy-endblocked methylphenylpolysiloxanes. Preferred systems for low temperature applications include silanol-functional methylphenylsiloxane-dimethylsiloxane copolymers and diphenylsiloxane-dimethylsiloxane copolymers, particularly wherein the molar content of the dimethylsiloxane units is about 93%.

Component (B2b1) may also consist of combinations of two or more organopolysiloxane fluids or gums. Most preferably, component (B2b1) is a polydimethylsiloxane homopolymer which is terminated with a silanol group at each end of the molecule.

Preferably, the molecular weight of the diorganopolysiloxane (B2b1) is sufficient to impart a Williams plasticity number of at least about 30 as determined by ASTM D-926-08, typically at least 100/100 mm. The Williams plasticity number, as used herein, is defined as the thickness in millimeters×100 of a cylindrical test specimen 2 $cm^3$ in volume and approximately 10 mm in height after the specimen has been subjected to a compressive load of 49 Newtons for three minutes at 25° C. Although there is no absolute upper limit on the plasticity of component (B2b1), practical considerations of processability in conventional mixing equipment generally restrict this value. Preferably, the plasticity number should be about 100 to 200, most preferably about 120 to 185. We have found that such gums can readily be dispersed in the one or more thermoplastic organic materials (B1) without the need for filler (B2c).

It has, however, been found that fluid diorganopolysiloxanes having a viscosity of about 100 000 to 1000 000 $mm^2 \cdot s^{-1}$ (cSt) at 25° C. often cannot be readily dispersed in the one or more thermoplastic organic materials (B1). Under these circumstances, the fluid must be mixed with up to about 300 parts by weight of filler (B2c), for each 100 parts by weight of (B2b1) in order to facilitate dispersion. Preferably, the fluid and filler are mixed before adding this combination to the one or more thermoplastic organic materials (B1), but these can be added separately.

Condensation Catalyst (B2b3).

In general, the condensation catalyst (B2b3) of the present invention is any compound which will promote the condensation reaction between the Si—OH groups of diorganopolysiloxane (B2b1) and the Si—H groups of the Organopolysiloxane having at least two Si-bonded hydrogen atoms, alternatively at least three Si-bonded hydrogen atoms per molecule (B2a2) so as to cure the former by the formation of —Si—O—Si— bonds. However, as noted above, catalyst (B2b3) cannot be a platinum compound or complex since the use of such a condensation catalyst often results in poor processing as well as poor physical properties of the resulting TPSiV.

The condensation catalyst (B2b3) is present in an amount sufficient to cure diorganopolysiloxane (B2b1) and the Organopolysiloxane having at least two Si-bonded hydrogen atoms, alternatively at least three Si-bonded hydrogen atoms per molecule (B2a2) (B2a2) as defined above.

Examples of suitable catalysts include metal carboxylates, such as dibutyltin diacetate, dibutyltin dilaurate, tin tripropyl acetate, stannous octoate, stannous oxalate, stannous naphthanate; amines, such as triethyl amine, ethylenetriamine; and quaternary ammonium compounds, such as benzyltrimethylammoniumhydroxide, beta-hydroxyethylltrimethylammonium-2-ethylhexoate and beta-hydroxyethylbenzyltrimethyldimethylammoniumbutoxide (see, e.g., U.S. Pat. No. 3,024,210).

Optional Reinforcing Filler (B2c).

Optionally the composition used to make the silicone elastomer may contain a reinforcing filler (B2c). The reinforcing filler (B2c) can for example be silica. The silica can for example be fumed (pyrogenic) silica, such as that sold by Cabot under the trade mark Cab-O-Sil MS-75D, or can be precipitated silica. The particle size of the silica is for example in the range 0.5 μm to 20 μm, alternatively 1 μm to 10 μm. The silica can be treated silica produced for example by treating silica with a silane or with a polysiloxane. The silane or polysiloxane used to treat the silica usually contains hydrophilic groups which bond to the silica surface and aliphatically unsaturated hydrocarbon or hydrocarbonoxy groups and/or Si-bonded hydrogen atoms.

The silica can for example be treated with an alkoxysilane, for example a silane comprising at least one Si-bonded alkoxy group and at least one Si-bonded alkenyl group or at least one Si-bonded hydrogen atom. The alkoxysilane can be a monoalkoxysilane, a dialkoxysilane or a trialkoxysilane containing at least one aliphatically unsaturated hydrocarbon group such as a vinylalkoxysilane, for example vinyltrimethoxysilane, vinyltriethoxysilane or vinymethyldimethoxysilane. The Si-bonded alkoxy groups are readily hydrolysable to silanol groups which bond to the silica surface.

The silica can alternatively be treated with a polysiloxane, for example an oligomeric organopolysiloxane, containing Si-bonded alkenyl groups and silanol end groups.

The silica can for example be treated with 2% to 60% by weight based on the silica of an alkoxysilane containing alkenyl groups or an oligomeric organopolysiloxane containing alkenyl groups.

Thermoplastic Organic Material (A)

The masterbatch as described above once prepared is introduced into the thermoplastic material (A). Similar to the one or more thermoplastic organic materials (B1), the thermoplastic material (A) may be selected from polycarbonates, blends of polycarbonates with other polymers as exemplified by polycarbonate-acrylonitrile-butadiene-styrene (PC/ABS) blends and polycarbonate-polybutylene terephthalate (PC/PBT) blends; polyamides exemplified by Nylons such as polycaprolactam (Nylon-6), polylauryllactam (Nylon-12), polyhexamethyleneadipamide (Nylon-6,6), and polyhexamethylenedodecanamide (Nylon-6,12), poly(hexamethylene sebacamide (Nylon 6,10), and blends of Nylons with other polymers; polyesters exemplified by polybutylene terephthalate (PBT), polyethylene terephthalate (PET), and polyethylene naphthalate (PEN); polyphenylene ether (PPE) and polyphenyleneoxide (PPO), and blends of PPE or PPO with styrenics such as high-impact polystyrene (HIPS), polystyrene, acrylonitrile-butadiene-styrene-(ABS) and styrene acrylonitrile resins (SAN); polyphenylene sulphide (PPS), polyether sulphone (PES), polyaramids, polyimides, phenyl-containing resins having a rigid rod structure, styrenic materials exemplified by ABS (acrylonitrile-butadiene-styrene), polystyrene (PS) HIPS; polyacrylates; halogenated plastics exemplified by polyvinyl chloride, fluoroplastics, and any other halogenated plastics; polyketones, polymethylmethacrylate (PMMA), Polyolefins exemplified by polypropylene (PP), polyethylene (PE) including high density polyethylene (HDPE) and low density polyethylene (LDPE), polybutene (PB) as well as, copolymers and blends of polyolefin, thermoplastic elastomers such as thermoplastic urethanes, thermoplastic polyolefinic elastomers, thermoplastic vulcanizates, and styrene ethylene butylene styrene (SEBS) copolymer, and natural products such as cellulosics, rayon, and polylactic acid. As previously indicated the one or more thermoplastic organic materials (B1) may be a mixture of more than one of the thermoplastic resins described above. Component (A)) may be a mixture of more than one of the thermoplastic materials described above. Component (A) and component (B1) may be the same or different.

Linear Organopolysiloxane (B3)

Linear organopolysiloxane (B3) is an optional additive and is either unreactive with (B2a2) when present during dynamic vulcanization or is added post completion of dynamic vulcanization. Linear organopolysiloxane (B3) may comprise trialkyl silyl termination, typically trimethylmethyl silyl termination, or dialkylhydroxy silyl termination, typically dimethylhydroxy silyl termination or dialkylalkenyl silyl termination typically dimethylvinyl silyl termination.

Linear organopolysiloxane (B3) may be a fluid or gum having a viscosity of at least 10 000 $mm^2 \cdot s^{-1}$ (cSt) at 25° C., alternatively at least 50 000 $mm^2 \cdot s^{-1}$ (cSt) at 25° C. alternatively at least 500 000 $mm^2 \cdot s^{-1}$ (cSt) at 25° C. alternatively a viscosity of 600,000 $mm^2 \cdot s^{-1}$ (cSt) or greater. The silicon-bonded organic groups of component (B3) are independently selected from hydrocarbon or halogenated hydrocarbon groups. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; alkenyl groups having 2 to 20 carbon atoms, such as vinyl, allyl and hexenyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane has a glass transition temperature (or melt point) which is below room temperature such that this component forms an elastomer when cured. At least 85, more preferably at least 90, mole percent of the silicon-bonded organic groups in component (B3) are methyl and/or ethyl groups, alternatively methyl groups.

Thus, polydiorganosiloxane (B3) can be a homopolymer, a copolymer or a terpolymer containing such organic groups. Examples include fluids or gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Stabilizer (C)

The composition herein may also comprise a stabilizer (C). Stabiliser (C) may be an antioxidant, for example a hindered phenol antioxidant such as tetrakis(methylene(3,5-di-tert-butyl-4-hydroxy-hydrocinnamate)methane sold by BASF under the trade mark 'Irganox® 1010'. Such an antioxidant can for example be used at 0.05 to 0.5% by weight of the thermoplastic composition.

Other Optional Additives (Component (D))

Other optional Additives (Component (D)) may be added into the thermoplastic compositions hereinbefore described to obtain a desired processing or performance property, and or to enhance compatibility between the silicone phase (B) and the thermoplastic matrix (A). These additives may be added into the composition in for example a silicone base if required to be present within the silicone elastomer or alternatively can be added directly into the thermoplastic matrix if the intention is for the additives to be within the thermoplastic matrix.

Such additional components may for example include softening mineral oils, plasticisers, other mineral fillers (i.e. excluding the (B2c) reinforcing fillers), viscosity modifiers, lubricants, coupling agent, thermoplastic elastomer and fire resistant additives, coloring agents such as pigments and/or dyes; effect pigments, such as diffractive pigments; interference pigments, such as pearlescent agents; reflective pigments and mixtures thereof and mixtures of any of the above pigments; UV stabilizers, fluidizing agents, anti-abrasion agents, mold-release agents, plasticizers, impact modifiers, surfactants, brighteners, fillers, fibers, waxes, and mixtures thereof, and/or any other additive well known in the field of polymers not described in (C).

Mineral oils are generally petroleum distillates in the $C_{15}$ to $C_{40}$ range, for example white oil, liquid paraffin or a naphthenic oil. If used, the mineral oil can for example be premixed with the thermoplastic organic polymer (A). The mineral oil can for example be present in an amount of from 0.5 to 20% by weight based on the thermoplastic organic polymer (A).

Plasticizers can be present in combination with or alternatively to mineral oils. Examples of suitable plasticisers include phosphate ester plasticisers such as triaryl phosphate isopropylated, resorcinal bis-(diphenyl phosphate) or phosphate ester sold by Great Lakes Chemical Corporation under the trade mark Reofos® RDP. Such plasticizers can for example be used in a range from 0.5 up to 15% by weight of the composition.

Coupling agents are selected from glycidyl ester functional polymers, organofunctional grafted polymers, organofunctional modified organopolysiloxane polymer compositions comprising a thermoplastic polymer selected from a polar and a non-polar polymer and a branched block copolymer of a polysiloxane and a polymer, or mixtures thereof.

Examples of other mineral fillers include talc or calcium carbonate. Fillers may be treated to make their surface hydrophobic. Such fillers, if present, are preferably present at a lower level than the reinforcing filler (B2c) such as silica. Said fillers may be premixed either with the thermoplastic organic polymer (A) or the silicone base (B).

Examples of pigments include carbon black and titanium dioxide. Pigments can for example be premixed with the thermoplastic organic polymer (A).

A lubricant can for example be a surface lubricating additive to improve the processability of the thermoplastic elastomer in moulding operations. An example of a surface lubricating additive is Ethylbutylstearamide sold by CRODA under the trade mark 'Crodamide-EBS'. A lubricant can for example be used at 0.1 to 2% by weight of the thermoplastic composition.

Also contemplated within the scope of this invention is the use of fire retardant additives to provide fire retardancy to the compositions of this invention. Traditional fire retardants can be used herein and can be selected from the group consisting of halogenated varieties such as polydibromostyrene, copolymers of dibromostyrene, polybromostyrene, brominated polystyrene, tetrabromophthalate esters, tetrabromophthalate diol, tetrabromophthalate anhydride, tetrabromobenzoate ester, hexabromocyclododecane, tetrabromobisphenol A, tetrabromobisphenol A bis(2,3-dibromopropyl ether), tetrabromobisphenol A bis(allyl ether), phenoxy-terminated carbonate oligomer of tetrabromobisphenol A, decabromodiphenylethane, decabromodiphenyl oxide, bis-(tribromophenoxyl)ethane, ethane-1,2-bis (pentabromophenyl), tetradecabromodiphenoxybenzene, ethylenebistetrabromophthalimide, ammonium bromide, poly pentabromobenzyl acrylate, brominated epoxy polymer, brominated epoxy oligomer, and brominated epoxies. Other, non-halogen varieties can be selected from such materials as triaryl phosphates isopropylated, cresyl diphenyl phosphate, tricresyl phosphate, trixylxl phosphate, triphenylphosphate, triaryl phosphates butylated, resorcinol bis-(diphenyl phosphate), bisphenol A bis(diphenyl phosphate), melamine phosphate, melamine pyrophosphate, melamine polyphosphate, dimelamine phosphate, melamine, melamine cyanurate, magnesium hydroxide, antimony trioxide, red phosphorous, zinc borate, and zinc stanate.

A single optional additive or multiple optional additives (Component (D)) may be used in the thermoplastic masterbatch composition. The total proportion of the one or more additives of component (D) present should not exceed 30 weight % of the total weight of the thermoplastic masterbatch composition. Preferably if there is one or more components (D) present the total cumulative amount of said additives is typically present from 0.01 to 20%, preferably from 0.01 to 10%, preferably from 0.01 to 5%, by weight out of the total weight of the masterbatch composition B.

The method of making a masterbatch (B) as hereinbefore described a method of making a masterbatch (B) as hereinbefore described comprising (i) blending the components used to produce silicone elastomer (B2) with one or more thermoplastic organic materials (B1), (ii) dynamically vulcanising the silicone composition to form silicone elastomer (B2), and (iii), introducing (B3), during step (ii) or after step (iii);

in which masterbatch (B) there is contained a total of from 20% to 60% by weight of components (B2)+(B3) based on the weight of (B1)+(B2)+(B3). Components (C) and (D) may be introduced at any point during the process. Preferably the resulting masterbatch is made into a pellet form after the completion of the above process.

In an alternative embodiment a method of making a thermoplastic composition by making a masterbatch (B) as hereinbefore described and blending the resulting masterbatch with one or more thermoplastic organic materials (A) in an amount such that the thermoplastic composition a total of from 0.2 to 25% by weight of cross-linked silicone elastomer based on the weight of (A)+(B). In one alternative the masterbatch is introduced into component (A) in a pelletised form. In another alternative both component (A) and component (B) are dry blended together in a pelletised form. The thermoplastic composition may be a thermoplastic elastomer composition.

Hence the method for making the thermoplastic composition comprises making a masterbatch (B)

a method of making a masterbatch (B) as hereinbefore described comprising (iv) blending the components used to produce silicone elastomer (B2) with one or more thermoplastic organic materials (B1), (v) dynamically vulcanising the silicone composition to form silicone elastomer (B2), and (vi) introducing (B3), during step (ii) or after step (iii);

in which masterbatch (B) there is contained a total of from 20% to 60% by weight of components (B2)+(B3) based on the weight of (B1)+(B2)+(B3) and blending the resulting masterbatch with one or more thermoplastic organic materials (A) in an amount such that the thermoplastic composition a total of from 0.2 to 25% by weight of cross-linked silicone elastomer based on the weight of (A)+(B). The thermoplastic composition may be a thermoplastic elastomer composition.

Several alternatives may be used for the processes described above. For example, the masterbatch (B) might be made as follows:

(i) mixing components used to produce silicone elastomer (B2) to form a silicone composition, (ii) blending the silicone composition of (i) into component (B1) comprising one or more thermoplastic organic materials, and (iii) dynamically vulcanising the silicone composition to form silicone elastomer (B2), and (iv) introducing (B3), when present, during step (ii) or after step (iii);

in which masterbatch (B) there is contained from 20% to 60% by weight of cross-linked silicone elastomer based on the weight of (B1)+(B2)+(B3). Alternatively masterbatch (B) might be made by heating and passing component (B1) one or more thermoplastic organic materials through an extruder and introducing the components used to produce silicone elastomer (B2) into component (B1) individually or collectively (i) mixing and dynamically vulcanising the components used to produce silicone elastomer (B2) to form silicone elastomer (B2), and (ii) introducing (B3), when present, during step (i) or after step (ii);

in which masterbatch (B) there is contained from 20% to 60% by weight of cross-linked silicone elastomer based on the weight of (B1)+(B2)+(B3).

The plastics processing operations and equipment for blending components B1, B2 and optional B3 as well as the blending of components (A) and (B) for making the thermoplastic composition utilising the need to soften the thermoplastic resins (A) and (B1) upon heat and allowing contact and uniform mixing of the ingredients may be carried out at temperatures within the range of from 60° C. up to 400° C. according to the softening or melting temperatures of the thermoplastic resin. Convenience equipment for any such process may be exemplified by, but is not restricted to, extrusion compounding operations utilising a uniaxial extruder, a biaxial extruder, or a multiaxial extruder. Alternatively blending can be undertaken using for example a batch internal mixer, such as a Z-blades mixer, or a Banbury mixer providing sufficient mixing time is allowed to ensure uniform distribution of the components.

Hereafter are provided a selection of alternative processes which may be utilised to make the masterbatch and thermoplastics elastomer composition as herein before described.

The masterbatch may be prepared using the following process in which successive insertion steps may be in the order provided but alternatively steps may be in an alternative order and in some instances some of the steps may be combined where appropriate depending on the processing equipment layout and the raw material compositions.

1. The one or more thermoplastic organic materials (B1) are first softened or melted at a temperature of from 60° C. up to 400° C. as required.
2. The components of (B2) involved in the dynamic vulcanization of the diorganopolysiloxane gum (B2a1) or (B2b1), to form the silicone elastomer portion of the masterbatch composition, are then introduced into the one or more thermoplastic organic materials (B1) at the elevated temperature.

Silicone elastomer (B2) is then prepared by dynamically curing one of the following cure compositions, optionally additionally containing one or more of (B2c), (B3), (C) and/or (D):

1) (B2a1) A diorganopolysiloxane having an average of at least two alkenyl groups per molecule and
   an organopolysiloxane having at least two Si-bonded hydrogen atoms, alternatively at least three Si-bonded hydrogen atoms per molecule (B2a2) and a hydrosilylation catalyst (B2a3) and optionally a catalyst inhibitor (B2a5);
2) (B2a1) A diorganopolysiloxane having an average of at least two alkenyl groups per molecule and a radical initiator (B2a4) and optionally organopolysiloxane having at least two Si-bonded hydrogen atoms, alternatively at least three Si-bonded hydrogen atoms per molecule (B2a2); or
3) a silanol terminated diorganopolysiloxane (B2b1),
   an organopolysiloxane having at least two Si-bonded hydrogen atoms, which contain an average of at least two silicon bonded hydrogen group (B2a2) and
   a condensation catalyst (B2b3).

The diorganopolysiloxane gum (B2a1) or (B2b1) is introduced and distributed under mechanical mixing energy into the softened or melted thermoplastic matrix of the one or more thermoplastic organic materials (B1).

The ingredients of the alternative cure packages are then introduced separately (no preferable order) or in combination distributed in the mixture to initiate and complete the vulcanization of the respective gum. As previously discussed a hydrosilylation (addition cure) reaction inhibitor (B2a5) may be optionally inserted in the mixture to increase the residence time before the completion of vulcanization reaction in the case of a hydrosilylation (addition) cure process. When utilised the inhibitor (B2a5) is introduced into the composition either before catalyst and/or cross-linker.

The optional additives (B2c), (B3), (C) and/or (D): may be introduced at the same time or separately during or after the dynamic cure process has completed, as required. A reinforcing filler for the diorganopolysiloxane (B2c) can be inserted separately. For example, the stabilizer additives (C) and additional components (D) can either be pre-blended in the one or more thermoplastic organic materials (B1) in a solid form prior to (B1) being exposed to elevated temperature or added in the melted one or more thermoplastic organic materials (B1) during the mixing operations.

Alternatively, rather than introducing each ingredient individually as described above pre-dispersed organopolysiloxane compositions may be introduced into the one or more thermoplastic organic materials (B1) at elevated temperature. The pre-dispersed organopolysiloxane compositions may comprise a single mixture of all the ingredients used to make the silicone elastomer or may utilise the introduction of a 2 or more mixtures which when mixed together complete the ingredients required to dynamically vulcanise (B2a1) or (B2b1) to form the silicone elastomer. The use of a pre-dispersed organopolysiloxane compound can complement or replace the individual ingredient insertion.

The pre-dispersed organosiloxane composition may comprise a diorganopolysiloxane with reactive groups or a blend of diorganopolysiloxane with reactive groups i.e. (B2a1) or (B2b1) either containing a reinforcing filler (B2c) or a cross-linker e.g. (B2a2) or a combination of a reinforcing filler (B2c) and cross-linker (B2a2). The components of the pre-dispersed organosiloxane compound composition are blended together before introduction into the one or more thermoplastic organic materials (B1). The other ingredients may then be introduced independently.

Alternatively, there may be two pre-dispersed compositions (i.e. a two part composition) mixed together in the heated one or more thermoplastic organic materials (B1):

1. The first part containing organopolysiloxane (B2a1 or B2b1) and a hydrosilylation catalyst (B2a3) or a condensation catalyst (B2b3);
2. The second part containing organopolysiloxane (B2a1 or B2b1), an organopolysiloxane having at least two Si-bonded hydrogen atoms, alternatively at least three Si-bonded hydrogen atoms per molecule (B2a2) and optionally a reaction inhibitor (B2a5).

In a further alternative one or more of the ingredients for making the silicone elastomer may be introduced into the one or more thermoplastic organic materials (B1) in the form of a pre-prepared masterbatch or liquid concentrate. For example, the appropriate cross-linker may be introduced into the composition for blending in a masterbatch with a thermoplastic material, e.g. the same material as a linear organopolysiloxane concentrate or siloxane masterbatch.

Similarly when present siloxane (B3) may be introduced in the form of a masterbatch prepared upstream through a separate mixing operation.

In a still further alternative the components of the composition used to make the silicone elastomer may be premixed and cured such that the cured silicone elastomer is blended into the one or more thermoplastic organic materials (B1) thereby avoiding the need for dynamic vulcanisation in the one or more thermoplastic organic materials (B1).

The silicone elastomer concentrate can be inserted in the final composition at elevated temperature, in the melted one or more thermoplastic organic materials (B1), or preblended with the one or more thermoplastic organic materials (B1) in its solid form prior the blend is inserted into the processing equipment and exposed to elevated temperature.

In a still further alternative, a masterbatch of (B3) (when required) and a masterbatch or masterbatches of the ingredients to make the silicone elastomer (B2) may all be pre-prepared and introduced into the one or more thermoplastic organic materials (B1) at elevated temperature and suitably mixed together.

Both the linear organopolysiloxane concentrate and a dispersed silicone elastomer concentrate intermediates can be combined during a subsequent mixing operation by either blending them together in their solid forms, or pre-blending them together in their solid forms before they are exposed to an elevated temperature mixing process; or by adding separately both intermediate at an elevated temperature and mixing energy exposure.

A portion of a thermoplastic resin (A) can optionally be added at any of the 3 steps to balance the composition and match the desire final composition.

Irrespective of the manner by which thermoplastic silicone vulcanisate masterbatch is prepared, the resulting masterbatch is preferably pelletised upon cooling of the one or more thermoplastic organic materials (B1) to form a thermoplastic silicone vulcanisate masterbatch.

The resulting pelletised masterbatch may be dry mixed with thermoplastic (A) before the resulting mixture is heated within the temperature arrange discussed for making the final thermoplastic composition as described above.

The thermoplastic compositions of this invention can be shaped by any of the processes typically used for thermoplastic materials, for example compression moulding, injection moulding, or extrusion, or 3D printing.

The composition of the invention may either be diluted at the desired dosage before the final process operation or shaping by inserting it into the core composition to be modified and blended in its solid form or uniformly mixed at elevated temperature in the core final composition at an intermediate compounding step, prior the shaping operation.

The composition of the invention is intended to be used alone or in combination with either a linear organosiloxane concentrate also depicted as a siloxane masterbatch, or in combination with a silicone elastomer concentrate resulting from the dynamical vulcanization of an organopolysiloxane distributed in a thermoplastic resin per the description disclosed in the present invention.

The novel thermoplastic elastomers of the present invention can be used for fabricating parts and components for automotive, electronics, electrical, communications, appliance and medical applications especially with respect to applications where sufficient feel and touch, scratch and mar resistance, chemical resistance and mechanical performances may be desired, simultaneously. For example, the thermoplastic compositions of this invention may be adapted to automotive applications such as airbag cover skins, steering wheel skins, gear knobs, grip handles, arm rests, interior skins, car mats (such as cup holder, bin, glove box mat), small knobs, switches, and large automotive parts such as glove box panel, dashboard, door panel, etc. (large meaning of surface greater than 20 $cm^2$). Due to its intrinsic elastomeric properties, it can also be used for weather insulation, such as mirror seal, interior and exterior seal.

The thermoplastic elastomer compositions of this invention may be used to electronics and appliances components such as belts, bracelets, soft temple tips, protective covers and wearable electronics; large electronic parts and accessories, hoses, boots, bellows, gaskets, soft-feel covers, keyboards' palm rest, parts and protective covers of laptops and tablet computing devices, protective covers; liquid line component and air ducts; architectural seals; bottle closures; furniture components; packaging components such as seals, bottles, cans, cups; resistant and soft-feel grips for hand held devices; medical and hygiene devices; cookware parts and accessories; sporting and leisure goods such as rackets, bike parts; footwear soles, toys, and general rubber parts.

The thermoplastic elastomer compositions of this invention can have a desirable soft touch feel to skin and/or comfortable grip, and/or high mechanical performance, and/or good scratch resistance and/or chemical resistance (stability to most commonly used chemicals). These attributes of soft touch feel to skin, good scratch resistance and chemical resistance and high mechanical performance can be retained when the thermoplastic elastomer is used in conditions such as prolonged contact with human skin. The silicone, being a breathable material, allows the thermoplastic elastomer to be permeable to gas and water vapour but is hydrophobic enough to limit water condensing inside the composition. As the silicone phase is cross-linked (vulcanised) during the mixing phase and is uniformly micro dispersed into the organic matrix, the thermoplastic elastomer composition has substantial chemical resistance and reduced water pick-up, thus protecting the organic matrix against potential hydrolysis and has high mechanical performance, scratch resistance, mechanical abrasion resistance and resistance to wear resulting in an overall improved durability.

The thermoplastic elastomer compositions of this invention have particular advantage when used to form wearable items such as watch bracelets, GPS bracelets, temple tips and nose pads for sun and reading glasses. Such wearable items retain their attributes over prolonged contact with human skin. The thermoplastic elastomer composition of this invention can thus have: a desirable soft touch feel to skin, good scratch resistance, and chemical resistance (stability to most commonly used chemicals). These attributes are retained when the thermoplastic composition e.g. thermoplastic elastomer composition elastomer is extruded, co-extruded, extruded—laminate, calendaring, extruded-calendaring or laminate to form a thermoplastic film, thermoplastic sheet and synthetic leather, with grain or none grain surfaces. The thermoplastic elastomer composition of this invention can be applied on textile creating a laminate forming a synthetic leather product. Co-extrusion or post processing with a compatible material, thermoplastic, synthetic woven or non-woven textile can be achieved to form a complex laminate. Co-extrusion or post processing with a non compatible material thermoplastic, synthetic or natural woven or non-woven textile, to form a complex laminate can be achieved using adequate primer or interfacial material.

Examples of applications are:

- synthetic leather for automotive application uses such as seat, door panel cover, gear knob, arm rests, steering wheels, wheels cover
- synthetic leather for appliance on electronic application such as electronic devices such as laptops or tablets providing soft touch feeling
- synthetic leather for sporting goods and footwear applications
- watch bands or straps for fitness tracking devices

EXAMPLES

The invention is illustrated by the following examples in which parts and percentages are by weight unless otherwise indicated. A commercial thermoplastic olefinic material MULTIFLEX® TPO 7003 SW BLK was utilised as the reference material. Samples were prepared by mixing the desired quantity of siloxane masterbatch additive pellets dry blended into MULTIFLEX® TPO 7003 SW BLK pellets in order to reach respectively 0 wt % (Control), 2 wt %, 5 wt %, 10 wt % and 20 wt % of the various siloxane masterbatch additives considered. The resulting mixture was then prepared as a thermoplastic material by injection moulding.

Several masterbatches have been prepared for the examples herein

Additives: [0110] Carrier: 100% by Weight of Polyethylene Carrier Used to Make the Following Masterbatches.

Masterbatch 1: A siloxane masterbatch comprising 50% by weight of a dimethylvinyl terminated polydimethylsiloxane gum having a plasticity of about 150 mm/100, a dimethylvinyl terminated polydimethylmethylvinylsiloxane gum having a plasticity of about 150 mm/100 and a hydrophobically treated silica filler and 50% by weight of polyethylene carrier, prepared using a twin screw extruder.

Masterbatch 2: A masterbatch comprising 50% by weight of a siloxane base comprising dimethylvinyl terminated polydimethylsiloxane gum having a plasticity of about 150 mm/100, a hydrophobically treated precipitated silica and 50% by weight of polyethylene carrier and an alkoxy silicone polymer: prepared with a 25 mm (L/D: 48) COPERION-ZSK twin screw extruder. In the Examples below 0.1% by weight of a Phenolic rad. Scavenger was also used in the composition of Masterbatch 2.)

Masterbatch 3: A 'TPSiV' Masterbatch made from the siloxane base of Masterbatch 2 in combination with a cure package comprising a methylhydrogen siloxane crosslinker (Dp: 56.6; D': 38.5) in an adjusted quantity corresponding to a hydrogen siloxane group over Vinyl siloxane group ratio of 6.0:1 and 2—a platinum IV catalyst at a 150 ppm concentration compared to Vinyl siloxane group concentration; the masterbatch 2: prepared with a 25 mm (L/D: 48) COPERION-ZSK twin screw extruder—pilot equipment.

Experimental Results

Initial experimental results are reported in Tables 1a, and 1b and Table 2.

TABLE 1a

Summary of experimental data - mechanical properties

| Additive | Additive content [wt %] | Hardness | Flexural Modulus | Notched IZOD impact −30° C. - | Notched IZOD impact −35° C. - | Notched IZOD impact −40° C. - |
|---|---|---|---|---|---|---|
| None | 0.0% | 40.9 | 672 | 58.91 | 32.92 | 7.98 |
| Carrier | 1.0% | 41.5 | 636 | 58.48 | 23.13 | 8.76 |
| Carrier | 2.5% | 41.5 | 622 | 57.85 | 24.82 | 7.94 |
| Carrier | 5.0% | 41.4 | 621 | 57.36 | 11.26 | 7.18 |
| Carrier | 10.0% | 40.8 | 515 | 52.36 | 10.62 | 6.94 |
| Masterbatch 1 | 2.0% | 42.2 | 607 | 59.88 | 40.19 | 8.18 |
| Masterbatch 1 | 5.0% | 40.2 | 592 | 55.86 | 42.01 | 9.17 |
| Masterbatch 1 | 10.0% | 37.9 | 529.5 | 55.35 | 36.65 | 9.99 |
| Masterbatch 1 | 20.0% | 33 | 421 | 43.72 | 26.725 | 10.49 |
| Masterbatch 2 | 2.0% | 41.9 | 654 | 59.83 | 34.76 | 8.26 |
| Masterbatch 2 | 5.0% | 40.7 | 589 | 61.15 | 48.71 | 8.56 |
| Masterbatch 2 | 10.0% | 39.9 | 539 | 61.6 | 51.92 | 11.19 |
| Masterbatch 2 | 20.0% | 38.2 | 422.5 | 61.98 | 52.82 | 18.58 |
| Masterbatch 3 | 2.0% | 41.4 | 632 | 59.32 | 40.59 | 9.26 |
| Masterbatch 3 | 5.0% | 41.4 | 576.5 | 63.98 | 53.19 | 9.52 |
| Masterbatch 3 | 10.0% | 40.3 | 535.5 | 64.87 | 56.11 | 18.095 |
| Masterbatch 3 | 20.0% | 38.4 | 406.5 | 66.68 | 63.33 | 52.88 |

-

Hardness was measured following ISO 868: 2003. Flexural Modulus was determined using—ISO 178:2013 Method A. Notched IZOD impact −30° C., Notched IZOD impact −35° C.—and Notched IZOD impact −40° C. were all completed using ISO 180/A: 2013. Yield stress, Yield strain, Tensile strength at 20%, Tensile strength at 100%, Tensile strength at break and Elongation at break all followed ISO 527-2/5A/500:2012 (Specimen 5A—500 mm/min); and Tear strength experiments were carried out following ISO 34-1:2015 Method B\a un-notched (500 mm/min).

TABLE 1b

Summary of experimental data - mechanical properties - continued

| Additive | Additive content [wt %] | Yield stress | Yield strain | Tensile strength at 20% (MPa) - | Tensile strength at 100% (MPa) | Tensile strength at break (MPa) | Elongation at break (%) | Tear Strength (N/mm) |
|---|---|---|---|---|---|---|---|---|
| None | 0.0% | 12.81 | 10.67 | 15.21 | 13.6 | 13.2 | 134.5 | 94.62 |
| Carrier | 1.0% | 14.86 | 13.56 | 14.78 | 13.31 | 13.1 | 122.5 | 94.33 |
| Carrier | 2.5% | 14.75 | 15.01 | 14.71 | 13.31 | 13 | 159.4 | 93.94 |
| Carrier | 5.0% | 14.66 | 17.11 | 14.64 | 13.38 | 12.9 | 197.9 | 94.47 |
| Carrier | 10.0% | 14.64 | 21.09 | 14.63 | 13.48 | 13.1 | 158.7 | 93.85 |
| Masterbatch 1 | 2.0% | 14.45 | 13.78 | 14.39 | 13.19 | 12.9 | 153.6 | 92.2 |
| Masterbatch 1 | 5.0% | 14.07 | 13.47 | 13.99 | 12.9 | 12.5 | 156.6 | 88.19 |

TABLE 1b-continued

Summary of experimental data - mechanical properties - continued

| Additive | Additive content [wt %] | Yield stress | Yield strain | Tensile strength at 20% (MPa) - | Tensile strength at 100% (MPa) | Tensile strength at break (MPa) | Elongation at break (%) | Tear Strength (N/mm) |
|---|---|---|---|---|---|---|---|---|
| Masterbatch 1 | 10.0% | 12.93 | 16.46 | 12.91 | 12.11 | 11.6 | 153.5 | 83.81 |
| Masterbatch 1 | 20.0% | 11.64 | 24.17 | 11.63 | 11.1 | 10.6 | 124.5 | 82.06 |
| Masterbatch 2 | 2.0% | 14.38 | 13.56 | 14.31 | 13.09 | 12.6 | 171.2 | 92.08 |
| Masterbatch 2 | 5.0% | 14.46 | 13.87 | 14.41 | 13.29 | 12.9 | 170 | 87.16 |
| Masterbatch 2 | 10.0% | 13.22 | 17.34 | 13.21 | 12.46 | 12.2 | 202.3 | 84.33 |
| Masterbatch 2 | 20.0% | 12.31 | 24.14 | 12.3 | 11.98 | 11.8 | 240.1 | 81.86 |
| Masterbatch 3 | 2.0% | 14.89 | 14.37 | 14.83 | 13.37 | 13.1 | 131.6 | 94.37 |
| Masterbatch 3 | 5.0% | 14.73 | 15.85 | 14.7 | 13.4 | 13.1 | 137.9 | 88.67 |
| Masterbatch 3 | 10.0% | 14.05 | 20.47 | 14.05 | 13.11 | 12.8 | 169.4 | 89.17 |
| Masterbatch 3 | 20.0% | 12.86 | 34.89 | 12.7 | 12.49 | 12.2 | 233.2 | 84.21 |

TABLE 2

Summary of experimental data - surface properties

| Additive | Additive content [wt %] | Taber abrasion resistance - weight loss | Renault MAR test D42-1775 \|ΔGloss\| | Renault MAR test D42-1775 \|ΔL*\| | PV3952 scratch (2 × 20 × 2.0 - Ø 1 mm - 10N) - \|ΔGloss\| | PV3952 scratch (2 × 20 × 2.0 - Ø 1 mm - 10N) - \|ΔL*\| | Coefficient of friction |
|---|---|---|---|---|---|---|---|
| None | 0.0 | 163.00 | 1.23 | 0.05 | 0.67 | 0.30 | 0.37 |
| Carrier | 1.0 | 163.74 | 1.27 | 0.02 | 0.73 | 1.02 | 0.36 |
| Carrier | 2.5 | 160.34 | 1.33 | 0.01 | 0.67 | 1.39 | 0.36 |
| Carrier | 5.0 | 165.65 | 1.13 | 0.02 | 0.70 | 0.59 | 0.38 |
| Carrier | 10.0 | | | | 0.70 | 1.00 | |
| Masterbatch 1 | 2.0 | 153.27 | 2.25 | 0.05 | 0.30 | 0.50 | 0.16 |
| Masterbatch 1 | 5.0 | 132.34 | 3.05 | 0.08 | 0.43 | 0.58 | 0.08 |
| Masterbatch 1 | 10.0 | 202.78 | 3.15 | 0.34 | 0.50 | 0.48 | 0.06 |
| Masterbatch 1 | 20.0 | | | | 1.37 | 1.35 | |
| Masterbatch 2 | 2.0 | 165.65 | 1.03 | 0.02 | 0.63 | 0.13 | 0.27 |
| Masterbatch 2 | 5.0 | 159.00 | 1.77 | 0.01 | 0.50 | 0.52 | 0.19 |
| Masterbatch 2 | 10.0 | 148.51 | 1.90 | 0.11 | 0.43 | 0.36 | 0.12 |
| Masterbatch 2 | 20.0 | | | | 0.47 | 0.28 | |
| Masterbatch 3 | 2.0 | 159.94 | 1.00 | 0.04 | 0.70 | 0.74 | 0.32 |
| Masterbatch 3 | 5.0 | 145.00 | 1.07 | 0.04 | 0.60 | 0.40 | 0.27 |
| Masterbatch 3 | 10.0 | 141.85 | 0.75 | 0.09 | 0.53 | 0.06 | 0.26 |
| Masterbatch 3 | 20.0 | | | | 0.50 | 0.32 | |

As can be seen results using Masterbatch 3 show a comparable flexibility improvement with Masterbatch 1 and masterbatch 2 ranging from a low 5% up to 40% lower flexural modulus respective to the addition level of from 2 wt % up to 20 wt % but Masterbatch 3 only exhibits a significant improvement of the impact resistance. The impact resistance improvement provided by Masterbatch 3 ranges from 1% resilience increase at 2 wt % additive usage up to 11% resilience increase at 20 wt % additive usage at a −30° C. test temperature. The impact resistance improvement is more significant at lower −35° C. or even −40° C. test temperature for which Masterbatch 3 exhibit an impact resilience increase by 16% at 2 wt % additive usage up to a five times superior resilience than the reference product (+500%) for the higher 20 wt % additive usage (Table 1a). Complementarily Masterbatch 3 improves the surface resistance to frictional wear by reducing up to 13% the abrasion weight loss, reducing the standardized surface gloss and chromatic change resulting in an overall improved scratch resistance—25% lower gloss |ΔGloss| change and constant low colour change |ΔL*| according to Renault MAR testing and constant <1 gloss |ΔGloss| and chromatic |ΔL*| change according to the Auto PV3952 standard (Table 2).

What we claimed is:

1. A thermoplastic composition comprising a blend of
(A) one or more thermoplastic organic materials, with
(B) a thermoplastic masterbatch composition comprising
(B1) one or more thermoplastic organic materials,
(B2) a silicone elastomer; and
(B3) an uncured organopolysiloxane polymer
in which the silicone elastomer (B2) is prepared by dynamic vulcanization of: a silanol terminated diorganopolysiloxane (B2b1), an organopolysiloxane having at least two Si-bonded hydrogen atoms (B2a2), and a condensation catalyst (B2b3),
in which the uncured organopolysiloxane polymer (B3) is present in an amount of from 0.1 to 25% by weight of the thermoplastic masterbatch composition (B), in which the thermoplastic masterbatch composition (B) there is contained from 20% to 60% by weight of silicone elastomer based on the weight of (B1)+(B2)+(B3),
and in which thermoplastic composition there is a total of from 0.2 to 25% by weight of silicone elastomer based on the weight of (A)+(B).

2. A composition in accordance with claim 1 wherein the one or more thermoplastic organic materials (B1) are selected from polycarbonates; polyamides; polyesters; polyphenylene ether (PPE) and polyphenyleneoxide (PPO); polyphenylene sulphide (PPS), polyether sulphone (PES), polyaramids, polyimides, phenyl-containing resins having a rigid rod structure, styrenic materials; polyacrylates, SAN; halogenated plastics; polyketones, polymethylmethacrylate (PMMA), polyolefins, copolymers and blends of polyolefin; thermoplastic urethanes, thermoplastic polyolefinic elastomers, thermoplastic vulcanizates; styrene ethylene butylene styrene (SEBS) copolymer, cellulosics, rayon, and polylactic acid.

3. A thermoplastic composition in accordance with claim 1 wherein one or more thermoplastic organic materials (A) is selected from polycarbonates; polyamides; polyesters; polyphenylene ether (PPE) and polyphenyleneoxide (PPO); polyphenylene sulphide (PPS), polyether sulphone (PES), polyaramids, polyimides, phenyl-containing resins having a rigid rod structure, styrenic materials; polyacrylates, SAN; halogenated plastics; polyketones, polymethylmethacrylate (PMMA), polyolefins, copolymers and blends of polyolefin; thermoplastic urethanes, thermoplastic polyolefinic elastomers, thermoplastic vulcanizates; styrene ethylene butylene styrene (SEBS) copolymer, cellulosics, rayon, and polylactic acid.

4. A thermoplastic composition in accordance with claim 1 wherein component (A) and component (B1) may be the same or different.

5. A thermoplastic composition in accordance with claim 1, wherein the uncured organopolysiloxane (B3) is a linear organopolysiloxane having trialkyl silyl termination, dialkylhydroxy silyl termination or dialkylalkenyl silyl termination.

6. A part or component for sports equipment, footwear, automotive, appliances, electronics, portable electronic, electrical, communication, and medical applications wherein the part or component comprises the thermoplastic composition in accordance with claim 1.

7. A wearable item selected from a bracelet or a support pad for sunglasses, reading glasses or wearable electronics, wherein the wearable item comprises the thermoplastic composition in accordance with claim 1.

* * * * *